United States Patent
Caseres et al.

(10) Patent No.: US 12,007,322 B2
(45) Date of Patent: Jun. 11, 2024

(54) CORROSION SENSORS SUITABLE FOR CORROSION UNDER INSULATION (CUI) DETECTION

(71) Applicant: Southwest Research Institute, San Antonio, TX (US)

(72) Inventors: Leonardo J. Caseres, Boerne, TX (US); James F. Dante, San Antonio, TX (US); Sergey A. Vinogradov, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 35 days.

(21) Appl. No.: 17/450,092

(22) Filed: Oct. 6, 2021

(65) Prior Publication Data
US 2023/0109269 A1    Apr. 6, 2023

(51) Int. Cl.
| G08B 7/06 | (2006.01) |
| G01N 17/04 | (2006.01) |
| G08B 3/10 | (2006.01) |
| G08B 5/36 | (2006.01) |

(52) U.S. Cl.
CPC ............... *G01N 17/04* (2013.01); *G08B 3/10* (2013.01); *G08B 5/36* (2013.01); *G08B 7/06* (2013.01)

(58) Field of Classification Search
CPC . G01N 17/04; G08B 3/10; G08B 5/36; G08B 7/06
See application file for complete search history.

(56) References Cited

U.S. PATENT DOCUMENTS

| 8,072,711 B1 * | 12/2011 | Wang | G01R 33/093 360/324 |
| 2016/0099090 A1 * | 4/2016 | Huang | H01B 7/2806 174/102 R |
| 2021/0018426 A1 * | 1/2021 | Amer | G01N 17/00 |

FOREIGN PATENT DOCUMENTS

| EP | 2831313 B1 * | 5/2017 | B01J 27/122 |
| WO | WO-2005100969 A2 * | 10/2005 | G01N 17/02 |
| WO | WO-2021053121 A1 * | 3/2021 | G01N 17/04 |

OTHER PUBLICATIONS

Alamin, et al., "Measurement and Monitoring of Corrosion Under Insulation using Passive LF RFID", the British Institute of Non-Destructive Testing, Northamption, UK, 2013, pp. 190-197.
(Continued)

*Primary Examiner* — Tarun Sinha
*Assistant Examiner* — James I Burris
(74) *Attorney, Agent, or Firm* — Grossman, Tucker, Perreault & Pfleger, PLLC (57) ABSTRACT

A sensor for use in detecting corrosion under insulation (CUI) and a method for deploying the same that does not require removal of cladding and/or insulation. The sensor includes at least a first sensor element formed of a first metal and a second sensor element formed of a second metal, the first and second metals being different. One or a plurality of sleeve members formed of an electrically-insulating material, such as plastic, maintain the first and second sensor elements at a predetermined distance from each other and define at least one sensing region that extends between the first and second sensor elements. The first and second sensor elements are configured to electrically communicate based on a conductive solution being disposed in the at least one sensing region and causing a galvanic current to be induced therebetween.

17 Claims, 4 Drawing Sheets

(56) References Cited

OTHER PUBLICATIONS

Ashbaugh, et al., "A Study of Corrosion of Steel Under a Variety of Thermal Insulation Materials", American Society for Testing and Materials, Philadelphia, 1985, pp. 121-131.
Aung, et al., "A New Method of Studying Buried Steel Corrosion and its Inhibition using the Wire Beam Electrode", Corrosion Science, vol. 46, Issue 12, 2004, pp. 3057-3067.
Aung, et al., "A Novel Electrochemical Method for Monitoring Corrosion Under Insulation", Anti-Corrosion Methods and Materials, 53/3, Emerald Group Publishing Limited, 2006, pp. 175-179.
Burleigh, et al., "Infrared Evaluation of Insulated Pipelines to Detect Water that Could Cause Corrosion under Insulation (CUI)", SPIE, vol. 8354, 83540P, Baltimore, MD, 2012, 13 pages.
Hladky, et al., The Measurement of Localized Corrosion using Electrochemical Noise, Corrosion Science, vol. 21, No. 4, Pergamon Press Ltd., Manchester, England, pp. 317-322.
Kim, et al., "Remote Field Eddy Current Testing for Detection of Stress Corrosion Cracks in Gas Transmission Pipelines", Materials Letters 58, Elsevier, 2004, pp. 2102-2104.
Koch, "Corrosion Cost and Preventive Strategies in the United States", 2002, 200 pages.
Koch, "Highway Bridges", Appendix D, 201 pages.
Koch, "Drinnking Water and Sewer Systems", Appendix K, 201 pages.
Koch, "Oil and Gas Exploration and Production", Appendix S, 185 pages.
Kwun, et al., "Feasibility of Under-Lagging Corrosion Detection in Steel Pipe Using the Magnetostrictive Sensor Technique", NDT & E International, vol. 28, Issue 4, 1995, pp. 211-214.
Lettich, "Is There a Cure for Corrosion Under Insulation?", Insulation Outlook Magazine, Herndon, VA, https://insulation.org/io/articles/is-there-a-cure-for-corrosion-under-insulation/, Nov. 5, 2020, 17 pages.
Lowe, et al., "Defect Detection in Pipes Using Guided Waves", Ultrasonics, vol. 36, Issues 1-5, 1998, pp. 147-154.
Lozev, et al., "Evaluation of Methods for Detecting and Monitoring of Corrosion Damage in Risers", Journal of Pressure Vessel Technology, Transactions of the ASME, vol. 127, 2005, pp. 244-254.
NACE, "Effectiveness of Cathodic Protection on Thermally Insulated Underground Metallic Structures", NACE Publication, 10A392, https://store.ampp.org/nace-publication-10a392-2019-effectiveness-of-cathodic-protection-on-thermally-insulated-underground-metallic-structures-311, Nov. 5, 2020, 3 pages.
Ong, et al., "Quantitative Characterization of Corrosion under Insulation", Journal of Nondestructive Evaluation, 16, 1997, https://link.springer.com/article/10.1007/BF02683883, Nov. 5, 2020, pp. 135-146.
Pechacek, "NDT Inspection of Insulated Vessels and Piping for Interior Corrosion and Corrosion Under Insulation", Materials Performance, 2004, pp. 28-32.
Scottini, et al., "Monitoring Average Wall Thickness of Insulated or Difficult to Access Objects with Pulsed Eddy Current", 7 pages.
Shrestha, et al., "Enhancement of Sensitivity and Accuracy of Micro/Nano Water Droplets Detection Using Galvanic-Coupled Arrays", Sensors, 19, 4500, MDPI, 2019, 11 pages.
Smulko, et al., "Detection of Random Transients Caused by Pitting Corrosion", Electrochimica Acta, vol. 47, Issue 8, 2002. pp 1297-1303, https://www.sciencedirect.com/science/article/abs/pii/S0013468601008507, Nov. 5, 2020.
Tan, et al., "Mapping Non-Uniform Corrosion Using the Wire Beam Electrode Method. II. Crevice Corrosion and Crevice Corrosion Exemption", Corrosion Science, vol. 43, Issue 10, 2001, pp. 1919-1929, https://www.sciencedirect.com/science/article/abs/pii/S0010938X00001918, Nov. 5, 2020.
Tan, et al., "Novel Corrosion Experiments Using the Wire Beam Electrode. (I) Studying Electrochemical Noise Signatures from Localised Corrosion Processes", Corrosion Science, vol. 48, Issue 1, 2006, pp. 23-38, https://www.sciencedirect.com/science/article/abs/pii/S0010938X05000284, Nov. 5, 2020.
Tan, et al., "Wire Beam Electrode: A New Tool for Studying Localised Corrosion and Other Heterogeneous Electrochemical Processes", Corrosion Science, vol. 41, Issue 2, 1998, pp. 229-247, https://www.sciencedirect.com/science/article/abs/pii/S0010938X98001206, Nov. 5, 2020.
Twomey, "Detect Corrosion Under Insulation", Hydrocarbon Processing, 1997, pp. 61-64.
Yang, et al., "Corrosion Measurement of the Atmospheric Environment Using Galvanic Cell Sensors", Sensors 19, 331, MDPI, 2019, 11 pages.

\* cited by examiner

CORROSION SENSORS SUITABLE FOR CORROSION UNDER INSULATION (CUI) DETECTION

FIELD

This specification relates generally to sensors to detect the presence of moisture, and more particularly, to sensors for detecting conditions giving rise to corrosion under pipe insulation and a method to deploy the sensors for CUI detection without removal of insulation and/or metal cladding surrounding pipes/vessels.

BACKGROUND

Corrosion and stress corrosion cracking of process pipes and vessels under insulation have been a long-standing issue in the process industries. Recent studies have identified that the total annual estimated direct cost of corrosion in the process industries in the United States has reached $303.2B. There remains a need for corrosion under insulation (CUI) detection that avoids the necessity of removal and replacement of pipe insulation and cladding, and the costs and complexity associated with CUI monitoring to avoid equipment downtimes.

BRIEF DESCRIPTION OF THE DRAWINGS

The drawings included herewith are for illustrating various examples of articles, methods, and apparatuses of the teaching of the present specification and are not intended to limit the scope of what is taught in any way.

DETAILED DESCRIPTION

Multiple approaches to deploying sensors under pipe/vessel insulation to detect CUI have been developed. However, wide-spread adoption of such sensors remains slow based on various negative impacts and challenges of current deployment and monitoring schemes. Some such challenges include high sensor costs and the use of dedicated equipment to collect, transmit, and process complex output data, and relatively limited coverage areas for monitoring. Worse yet, deploying sensors can include system disruption and the necessity of removing insulation that surrounds pipes/vessels. Thus, a non-destructive, low-cost and scalable approach to monitoring conditions giving rise to CUI is desirable.

Thus, the present disclosure is generally directed to a sensor for use in detecting corrosion under insulation (CUI) and a method for deploying the same that does not require removal of cladding and/or insulation. The sensor includes at least a first sensor element formed of a first metal and a second sensor element formed of a second metal, the first and second metals being different. One or a plurality of sleeve members formed of an electrically-insulating material, such as plastic, maintain the first and second sensor elements at a predetermined distance from each other and define at least one sensing region that extends between the first and second sensor elements. The first and second sensor elements are configured to electrically communicate based on a conductive solution being disposed in the at least one sensing region and causing a galvanic current to be induced therebetween. A magnetic field also gets formed between the first and second elements when in electrical communication with each other, with the magnetic field having a magnitude proportional to the amount of galvanic current. Accordingly, a sensor terminal consistent with the present disclosure then preferably utilizes a hall effect sensor to measure the galvanic current based on measuring the associated magnetic field, and thus by extension, detect the presence of conditions giving rise to corrosion.

In one specific non-limiting example, a sensor is disclosed that includes a coated sensor member disposed adjacent a non-coated sensor member. The coating of the coated sensor member may be selected to match a coating used between a pipe/vessel and associated insulation to protect components. Some such example coatings include, without limitation, polymer-based epoxy, polyurethane, siloxane-based coatings or any other coating material which can be used to protect components such as tanks and pipes. In the event the target coating on the coated sensor begins to degrade, e.g., due to corrosion, the coated and non-coated sensors electrically couple and a galvanic current gets induced therebetween. A sensor terminal may then detect the degradation of the coating based on the induced galvanic current. For example, the sensor terminal can include a hall effect sensor that detects the induced galvanic current based on measuring an associated magnetic field, with the magnitude of the associated magnetic field being proportional to the induced galvanic current as discussed above. In this preferred example, the sensor can also include additional uncoated sensor members that are configured to detect the presence of conditions giving rise to corrosion such as the presence of moisture. Therefore, the sensor may then be configured to detect coating degradation, conditions giving rise to CUI, or both.

Preferably, a sensor consistent with the present disclosure is disposed on a sidewall of a pipe/vessel, and more preferably, between the sidewall of a pipe or vessel and insulation surrounding the same. The sensor terminal of the sensor is preferably disposed on an outer surface of the insulation and electrically couples with the sensor by way of an electrical interconnect that extends through the insulation. The sensor terminal can be configured to provide an audible and/or visual indication of conditions giving rise to corrosion beneath the insulation in response to an electrical signal from the sensor indicating the presence of a conductive solution and/or coating degradation. The sensor terminal can include, for example, one or a plurality of light emitting diodes (LEDs) that get energized by the sensor terminal to visually indicate the presence of corrosion conditions.

A method for non-destructive deployment of sensors for CUI detection is also disclosed. The method can include utilizing a sensor dispenser configured to be inserted into insulation surrounding a pipe/vessel. The sensor dispenser may then be configured to dispose a sensor on to a sidewall defining the pipe/vessel. The sensor dispenser may then be withdrawn from the insulation and allow for electrical coupling of the sensor with a sensor terminal, e.g., based on coated wire(s) or other suitable electrical interconnects that electrically couple to the sensor and extend at least partially through the insulation. Accordingly, sensors consistent with the present disclosure may be deployed without the necessity of removing insulation surrounding pipes and vessels.

Although the following disclosure discusses sensing of CUT, various aspects and examples are equally applicable to other applications, and in particular, applications where visual assessment of a component is obscured/prevented and/or a target measurement (e.g., wetness, coating degradation, and so on), cannot be gathered/captured without at least partial disassembly of the component.

The term "coupled" as used herein refers to any connection, coupling, link or the like between elements. Such "coupled" elements are not necessarily directly connected to one another and may be separated by intermediate components or devices. The term "directly coupled" refers to a connection between elements without an intermediate component or device.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the target characteristic. To provide one non-limiting numerical example to quantify "substantially," minor variation may cause a deviation of up to and including ±10% from a target quality/characteristic unless otherwise provided by the present disclosure.

Figure 1:
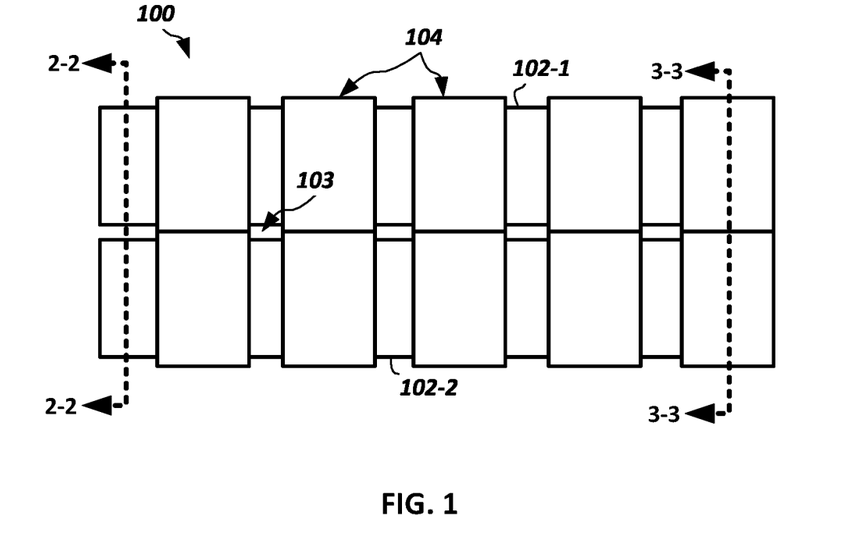
FIG. 1 shows an example sensor in accordance with aspects of the present disclosure.

FIG. 1 shows a top view of an example sensor 100 in accordance with an embodiment of the present disclosure. As shown, the sensor 100 includes at least first and second sensor elements 102-1, 102-2, and a plurality of sleeve members 104. The sensor 100 may also be referred to herein as a sensor transducer.

The particular materials for the first and second sensor elements 102-1, 102-2, are preferably selected to introduce bimetallic (or galvanic) coupling when brought into electrical communication with each other. In one example, the first sensor element 102-1 comprises copper and the second sensor element 102-2 comprises magnesium. Galvanic coupling occurs when dissimilar/different metals are exposed to a conductive solution, e.g., electrically conductive solution 106 shown in FIG. 2. Once electrically coupled, electron flow occurs between the first and second sensor elements 102-1, 102-2. This electron flow may also be referred to as a galvanic current. The first and second sensor elements 102-1, 102-2 may also be collectively referred to as a sensor element pair. The first and second sensor elements 102-1, 102-2 preferably extend parallel with each other.

The flow of electrons, which is to say which of the first or second sensor element 102-1, 102-2 acts as a cathode (e.g., a positive terminal) or as an anode (e.g., a negative terminal), is based on the particular metals chosen for the first and second sensor elements 102-1, 102-2.

Figure 2:
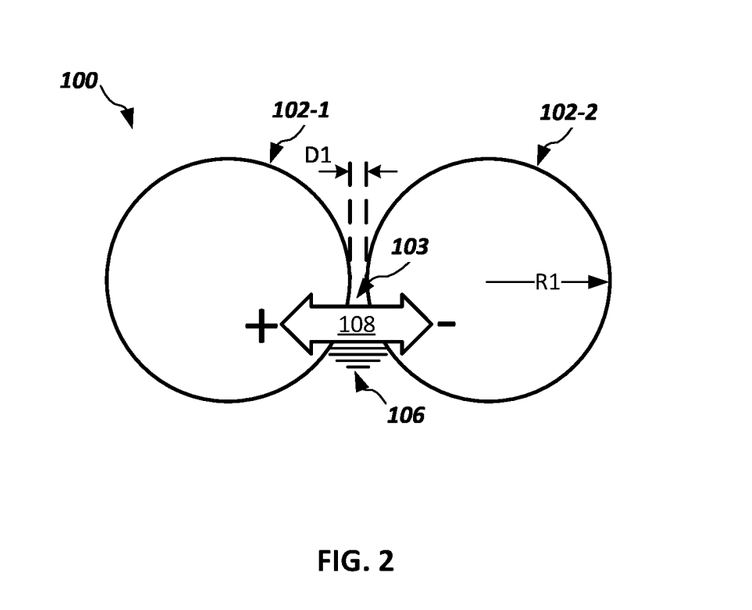
FIG. 2 shows an example cross-sectional view of the sensor of FIG. 1 taken along line 2-2, in accordance with aspects of the present disclosure.

For example, FIG. 2 shows a cross-sectional view of the sensor 100 taken along line 2-2 of FIG. 1. In this example, introduction of electrically conductive solution 106 can cause the first and second sensor elements 102-1, 102-2 to electrically couple and induce a galvanic current 108 there between. The first sensor element 102-1 therefore includes a metal with a higher electrical resistance and thus becomes cathodic. On the other hand, the second sensor element 102-2 then becomes anodic. The resulting galvanic current 108 then introduces a local magnetic field, wherein the magnitude of the galvanic current 108 is proportional to the local magnetic field.

Preferably, each of the first and second sensor elements 102-1, 102-2 are uncoated, e.g., are bare metal, for purposes of establishing the galvanic current 108. As discussed further below with regard to FIGS. 4 and 5, an uncoated sensor element may be paired with a coated sensor element to detect coating degradation.

Each of the first and second sensor elements 102-1, 102-2 can include a substantially cylindrical shape, although other shapes and profiles are within the scope of this disclosure. For example, the first and second sensor elements 102-1, 102-2 can include any regular or irregular geometric profile including, for example, rectangular, octagonal, and oval. Preferably, the first and second sensor elements 102-1, 102-2 include a substantially similar shape, although this disclosure is not limited in this regard.

In the preferred example of the first and second sensor elements 102-1, 102-2 shown in FIG. 2, each sensor element includes a substantially circular cross-section having a radius of R1. The radius R1 may measure in a range of 0.05 inches to 0.50 inches, and preferably 0.0625 inch such that the overall diameter is 0.125 inches.

Each of the first and second sensor elements 102-1, 102-2 can include an overall length in a range of 1.0 inch to 20 inches, and preferably at least 10 inches. Note, the particular length chosen for the first and second sensor elements 102-1, 102-2 may be chosen based on a desired application and the provided examples are not intended to be limiting. Preferably, the aspect ratio of the first and second sensor elements 102-1, 102-2 (e.g., length relative to width) is 2:1, 2:1.5, 3:1, or 4:1, and more preferably at least 2:1.

Preferably, the sensor 100 includes a plurality of sleeve members 104 although a single sleeve member is within the scope of this disclosure. The sleeve members 104 can comprise an electrically insulating material such as polyethylene, and preferably high-density polyethylene (HDPE). In one example, the plurality of sleeve members 104 comprises a material that allows for the same to bend/flex to allow the sensor 100 to have a shape that generally corresponds to the surface the same is disposed on. For example, when the sensor 100 gets disposed on a substantially arcuate/round surface, such as a pipe, the sleeve members 104 may then bend/deform to follow the curved/round contours of the surface. Alternatively, or in addition, the plurality of sleeve members 104 may include a shape, such as a curved shape, that corresponds to the contours of a surface on which the sensor 100 is disposed. Some examples of flexible materials suitable for use in the plurality of sleeve members include flexible spiral wraps made of HPDE or other high temperature materials, depending on the application.

The sleeve members 104 are preferably configured to maintain a uniform offset distance of D1 (also referred to herein as a first predetermined distance) between the first and second sensor elements 102-1, 102-2 (See FIG. 2). The first and second sensor elements may then be described as within operable proximity of each other when disposed at the offset distance D1 from each other. The offset distance of D1 can be in a range of $\frac{1}{32}$ inches to $\frac{1}{4}$ inches, and preferably at least $\frac{1}{8}$ inches. More preferably, the offset distance D1 is uniform along the length of the first and second sensor elements 102-1, 102-2.

The sleeve members 104 are configured to be spaced apart from each other based on offset distance D1 to provide at least one sensing region 103 between the first and second sensor elements 102-1, 102-2. Preferably, the at least one sensing region 103 includes a plurality of sensing regions. The at least one sensing regions 103 therefore allow for electrical communication between the first and second sensor elements 102-1, 102-2 when exposed to conditions giving rise to corrosion such as leaked fluid from a pipe or other sources of moisture that result in electrically conductive solution 106 being present and in (direct) contact with sensor elements.

The sleeve members 104 are also preferably configured to maintain an offset distance of D2 (See FIG. 3) between the first and second sensor elements 102-1, 102-2 and a supporting structure such as the sidewall of a metal pipe to provide electrical isolation. The offset distance D2 can measure in a range of 1/32 inches to 1/4 inches, and preferably at least 1/8 inches. The offset distance D2 is preferably uniform along the length of each of the first and second sensor elements 102-1, 102-2. The offset distance D2 may also be referred to herein as a second predetermined distance.

Figure 3:
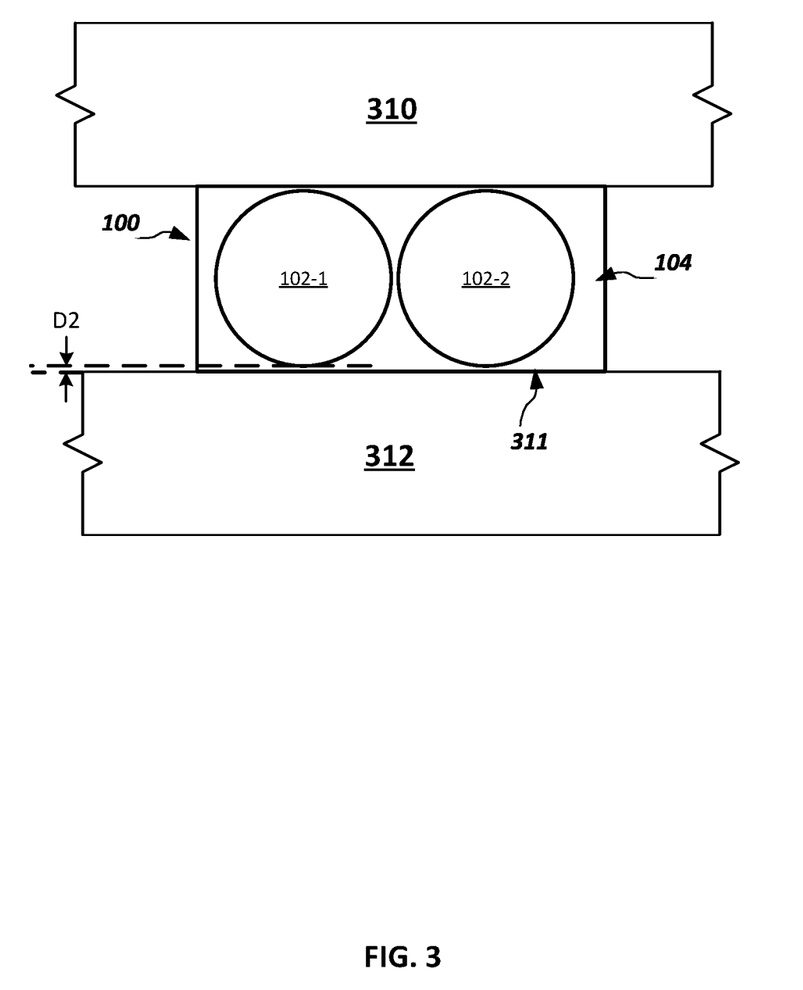
FIG. 3 shows another example cross-sectional view of the sensor of FIG. 1 taken along line 3-3, in accordance with aspects of the present disclosure.

For example, FIG. 3 shows a cross-sectional view of the sensor 100 taken along line 3-3 of FIG. 1. As shown, the cross-sectional view of FIG. 3 illustrates the sensor 100 disposed between an insulation layer 310 and the sidewall 312 of a metal pipe. In this preferred example, the plurality of sleeve members 104 maintain the offset distance of D2 between the first and second sensor elements 102-1, 102-2 and the sidewall 312 defining the metal pipe. Preferably, the plurality of sleeve members 104 defines a mating surface 311 for coupling to a sidewall of a pipe or vessel. The mating surface 311 may be substantially flat/planar, although other shapes and profiles are within the scope of this disclosure such as a rounded/curved shape.

Figure 4:
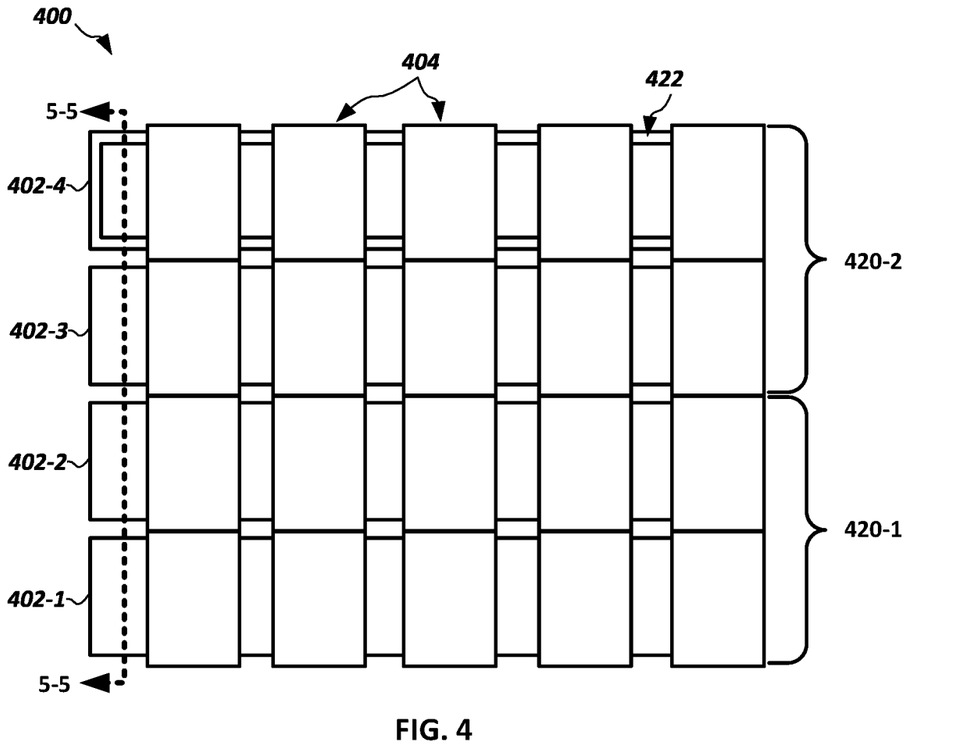
FIG. 4 shows another example sensor in accordance with aspects of the present disclosure.

FIG. 4 shows a top view of another example sensor 400 in accordance with an embodiment. As shown, the sensor 400 includes a plurality of sensor pairs, namely a first sensor pair 420-1 and a second sensor pair 420-2. The example sensor 400 further includes a plurality of sleeve members 404. The first and second sensor pairs 420-1, 420-2 preferably extend parallel with each other.

The plurality of sleeve members 404 may be configured substantially similar to the sleeve members 104 of FIG. 1, the teachings of which are equally applicable to the plurality of sleeve members 404 and will not be repeated for brevity.

As shown in FIG. 4, the first sensor pair 420-1 includes a first sensor element 402-1 disposed adjacent a second sensor element 402-2; and the second sensor pair 420-2 includes a third sensor element 402-3 disposed adjacent a fourth sensor element 402-4. The first, second, third and fourth sensor elements may be configured substantially similar to the first and second sensor elements 102-1, 102-2 discussed above, the teachings of which are equally applicable to the sensor elements of FIG. 4 and will not be repeated for brevity.

However, as shown in FIG. 4, the first sensor pair 420-1 includes uncoated sensor members configured to detect moisture based on the presence of a conductive solution electrically connecting the first and second sensor elements 402-1, 402-2 and causing a galvanic current to be induced there between as discussed above with reference to FIG. 2, and the second sensor pair 420-2 includes a coated sensor element and an uncoated sensor element configured to detect degradation of a coating. For example, and as shown, first and second sensor elements are uncoated, e.g., bare metal. In contrast, the fourth sensor element 402-4 is coated with a target coating 422 and the third sensor element 402-3 is uncoated. Preferably, the material forming the second and third sensor elements 402-2, 402-3 is of the same metal type to avoid introducing a galvanic current therebetween.

The coating 422 at least partially surrounds the external surfaces defining the fourth sensor element 402-4, and more preferably, fully surrounds the external surfaces defining the fourth sensor element 402-4. The coating 422 can comprise a polymer-based epoxy, polyurethane, or siloxane-based coating, for example. More preferably, the coating 422 comprises a material used to coat one or more elements along a pipe/vessel such as tanks and pipes to provide protection of those components.

In the event the coating 422 begins to degrade, e.g., due to the presence of a corrosive substance/fluid, a galvanic current may then be introduced between the third and fourth sensor elements 402-3, 402-4, as discussed in further detail below. The galvanic current then increases proportional to the amount of degradation of the coating 422.

Figure 5:
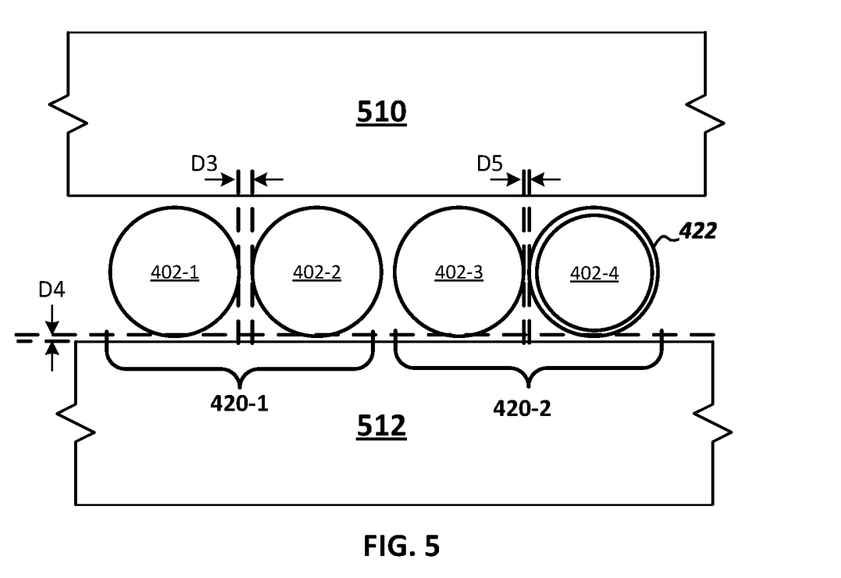
FIG. 5 shows a cross-sectional view of the sensor of FIG. 4 taken along line 5-5, in accordance with aspects of the present disclosure.

FIG. 5 shows a cross-sectional view of the sensor 400 taken along line 5-5 of FIG. 4, in accordance with an embodiment. As shown, the sensor 400 is disposed between a sidewall 512 of a pipe.

Preferably, the first and second sensor elements 402-1, 402-2 are disposed within operable proximity of each other based on offset distance D3. For example, the first and second sensor elements 402-1, 402-2 can be disposed at an offset distance of D3 from each other, with the offset distance D3 being preferably equal to offset distance D1 as discussed above with regard to FIG. 2.

The first and second sensor elements 402-1, 402-2 can be disposed at a distance of D4 from the sidewall 512, with distance D4 preferably being equal to offset distance D2 as discussed above with regard to FIG. 3.

The third and fourth sensor elements 402-3, 402-4 can be disposed at an offset distance of D5 from each other. The offset distance D5 may be less than the offset distance D3 between the first and second sensor elements 402-1, 402-2. For example, the offset distance D5 may measure in a range of 1/32 inches to 1/4 inches, and preferably at least 1/8 inches. Alternatively, the offset distance D5 may be substantially equal to D3, or greater than D3, depending on a desired configuration. The third and fourth sensor elements 402-3, 402-4 may also be disposed at a distance D4 from sidewall 512, although other distances are within the scope of this disclosure.

Note, the sensor 400 can include N number of sensor pairs and not necessarily two as shown. The sensor 400 may also be referred to as a sensor matrix.

Preferably, one or a plurality of sensor pairs of the sensor 400 may be implemented to detect moisture/conductive solutions present between the sidewall 512 and the insulation 510 (e.g., be uncoated), and one or a plurality of sensor pairs of the sensor 400 may be implemented to detect degradation/failure of one or more target coatings. Thus, the presence of a conductive solution contacting the first and second sensor elements 402-1, 402-2 of the first sensor pair 420-1 induces a galvanic current there between for detection purposes.

On the other hand, the third and fourth sensor elements 402-3, 402-4 preferably will not electrically communicate and develop a galvanic current so long as the coating 422 remains absent of damage/defects. As damage and degradation of the coating 422 occur due to ingress of moisture and/or the presence of other conditions that can cause a chemical reaction of coating 422 (e.g., temperature fluctuations, pH changes, corrosive substances such as salt, and/or pressure), a galvanic current and local magnetic field will then form between the third and fourth sensor elements 402-3, 402-4. The onset of the local magnetic field between the third and fourth sensor elements 402-3, 402-4 may then be used as an indication of the start/onset of coating degradation.

Thus, any number of coatings may be monitored to detect failure/degradation between the sidewall 512 and the insulation 510 by implementing sensor pairs similar to the second sensor pair 420-2. Preferably, the sensor 400 may then both detect the presence of conditions giving rise to corrosion under the insulation 510, and the onset of degradation of one or more target coatings. However, the sensor 400 may be configured with N sensor pairs to detect only coating degradation for one or more target coatings, or N sensor pairs to detect only moisture/conditions giving rise to corrosion. Accordingly, the particular configuration of sensor 400 may be selected based on a desired application and this disclosure is not limited to the particular example shown in FIG. 4.

Likewise, the number of sensor pairs and sensor element dimensions may also be chosen to cover a desired pipe/vessel surface area. Thus, sensors consistent with the present disclosure may be scaled with relatively minor modification to cover a desired area of pipes/vessels for monitoring purposes.

Figure 6:
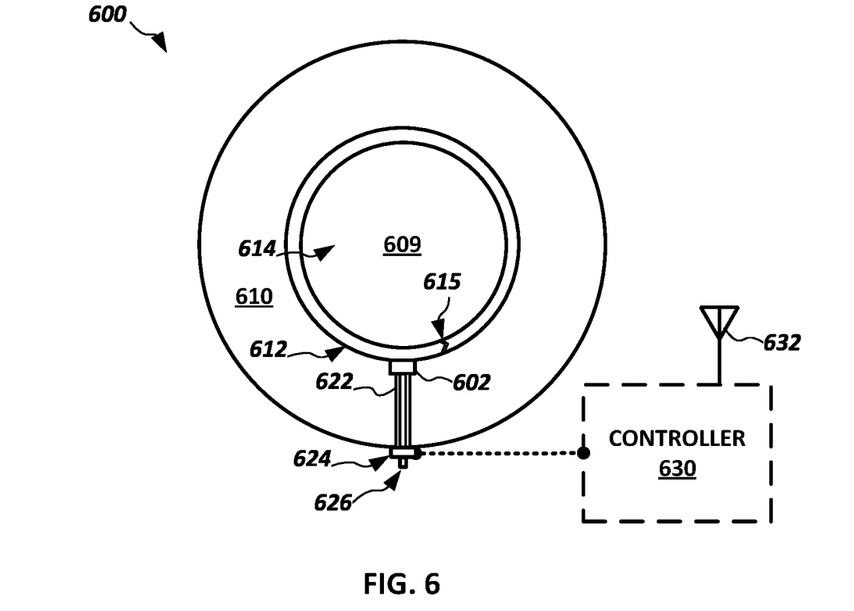
FIG. 6 shows a cross-sectional view of a pipe assembly consistent with an aspect of the present disclosure.

FIG. 6 shows a cross-sectional view of a pipe assembly 600 in accordance with aspects of the present disclosure. As shown, the pipe assembly 600 includes a pipe 609 and insulation 610 surrounding the pipe 609. The pipe 609 includes a sidewall 612 that defines an inner cavity 614. The inner cavity 614 of the pipe 609 can be configured to communicate oil, water, or any other process fluid between two or more locations.

The pipe assembly 600 can further include insulation 610 that surrounds the pipe 609. Preferably, the insulation 610 directly contacts sidewall 612 to form an interface there between. Note, the pipe assembly 600 may also include a metal cladding layer (not shown) disposed on the insulation 610.

In the example of FIG. 6, a sensor 602 configured consistent with the present disclosure is disposed between the pipe 609 and the insulation 610. More preferably, the sensor 602 is directly coupled, or otherwise in close proximity of, sidewall 612 of the pipe 609. Likewise, the sensor 602 preferably directly couples with insulation 610. The sensor 602 is preferably implemented as sensor 100 or sensor 400 as discussed above.

Electrical interconnect 622 includes a first end electrically coupled to the sensor 602 and second end electrically coupled a sensor terminal 624. Preferably, the electrical interconnect 622 extends at least partially through the insulation 610, and more preferably, extends through the insulation 610 to an outer surface defining the insulation 610 to electrically couple to the sensor terminal 624.

Preferably, the electrical interconnect 622 comprises a plurality of electrical conductors, with each electrical conductor to couple to a respective sensor element associated with the sensor 602. More preferably, the electrical interconnect 622 comprises flexible conductors such as 14 AWG coated wires, although other wire gauges are within the scope of this disclosure. Note, the sensor 602 may not necessarily communicate with the sensor terminal 624 via a wired connection, such as shown in FIG. 6, and instead may communicate wirelessly through near-field communication (NFC), and preferably through a low-power wireless communication network, e.g., a Bluetooth Low Energy (BLE) communication network.

Preferably, the sensor terminal 624 is disposed external to the insulation 610 such that the same can be visibly observed by a technician without the necessity of opening or otherwise displacing insulation 610 and/or metal cladding. Note, the sensor terminal 624 may also be referred to herein as a remote sensor terminal or a top-side sensor terminal. The sensor terminal 624 can comprise one or more components configured to receive a signal from the sensor 602 and provide an indication of a detected fault condition.

Preferably, the sensor terminal 624 comprises a Hall effect sensor capable of detecting galvanic current induced between sensor elements of 602 through measurement of an associated local magnetic field to be detected outside of the cladding.

In an embodiment, the sensor 602 can generate galvanic currents in the order of 1-40 milliamps (mA) and voltages of 0.2 V and greater. The magnitude/power of the local magnetic field will then be in the order of Earth's magnetic field, e.g., 0.25 to 0.6 Gauss or higher. Since the magnetic field of the earth remains relatively stable, the same may be used as a predetermined threshold. The local magnetic field formed between sensor elements of the sensor 602 then introduce fluctuations that can be detected by the Hall effect sensor, and when the same exceed the predetermined threshold, conditions giving rise to corrosion under insulation can be detected. The magnitude of the magnetic field can be further increased to 2-3 Gausses, for example, based on the electrical interconnect 622 being shaped to wrap around a high magnetic permeability core material (not shown) such as nickel or iron.

Detected fault conditions can include, for example, presence of conditions giving rise to corrosion under the insulation 610, e.g., based on moisture/conductive solution inducing a galvanic current between sensor elements of the sensor 602, and/or degradation of a target coating disposed on a sensor element of the sensor 602. For example, a crack 615 disposed along the pipe 609 may allow for fluids to leak out and induce corrosion beneath insulation 610.

The sensor terminal 624 may then visually present the indication of the detected fault condition via at least one light emitting diode (LED) 626. For example, the at least one LED 626 may then be energized to allow for a technician to identify a detected fault condition. The at least one LED 626 may further include at least one LED to indicate the presence of conditions giving rise to corrosion under the insulation 610 (e.g., a conductive solution), and/or at least one LED to indicate the degradation of one or more target coatings.

Alternatively, or in addition to the at least one LED 626, the sensor terminal 624 can include a controller 630 and an optional network interface circuit 632. The network interface circuit 632 may be configured to communicate with a local area network via Wi-Fi, for example, and/or a wide area network (WAN) such as the Internet. More preferably, the network interface circuit 632 is implemented as an Internet of Things (IoT) device that utilizes an ultra-low-power modem (e.g., having a sleep current of 1 micro amperes or less) to communicate on cellular networks (e.g., 3G, 4G, and 5G LTE networks).

The controller 630 may then receive an indication of a detected fault condition from the sensor 602 by way of electrical interconnect 622 (or wirelessly, as the case may be). The indication of the detected fault condition from the sensor 602 can be, for example, an electrical signal that represents the magnitude of a magnetic field between sensor elements of the sensor 602. The controller 630 may then determine a galvanic current value based on the electrical signal from the sensor 602. The controller 630 may then compare the determined galvanic current value to a predetermined threshold (e.g., based on the Earth's magnetic field), as discussed above, to determine if a fault event/condition is occurring. The controller 630 may then send a fault message to a remote computing device via the network interface circuit 632 based on the determined galvanic current exceeding the predetermined threshold. Alternatively, or in addition, the controller 630 may audibly and/or visually indicate the detected fault condition by, for instance, energizing the at least one LED 626.

Preferably, the sensor terminal 624 includes a power supply such as one or more battery cells (not shown), and more preferably, one or more rechargeable battery cells to power the controller 630 and the optional network interface circuit 632.

The remote computing device can comprise, for example, a laptop, smart phone, tablet, or server computer. The remote computing device may also be so-called "cloud-based" to allow for N number of sensors consistent with the present disclosure to transmit fault events and other information for monitoring and archival purposes.

In any such cases, the fault message sent via the network interface circuit 632 may also include an identifier of the sensor. The identifier of the sensor can include, for example, a geographic location of the sensor (e.g., GPS coordinates), or any other information that allows for identifying which sensor communicated the fault message. Preferably, the fault message allows a remote computing device to determine the initial start of the fault and a rate of increase for the fault condition. For example, the controller 630 may be configured to cause the network interface circuit 632 to send a sequence of fault messages that include a value representative of the change in magnitude of the induced galvanic current. Accordingly, the severity and rate of change (e.g., aggressiveness) for a fault detected by the sensor 602 may be monitored in a real-time manner. Alternatively, or in addition, the severity of a fault detected by the sensor 602 may be audibly or visually displayed, e.g., by varying the intensity of light emitted by the at least one LED 626.

Note, the sensor terminal 624 may electrically couple to N number of sensors consistent with the present disclosure, and not necessarily a single sensor as shown in FIG. 6.

Figure 7:
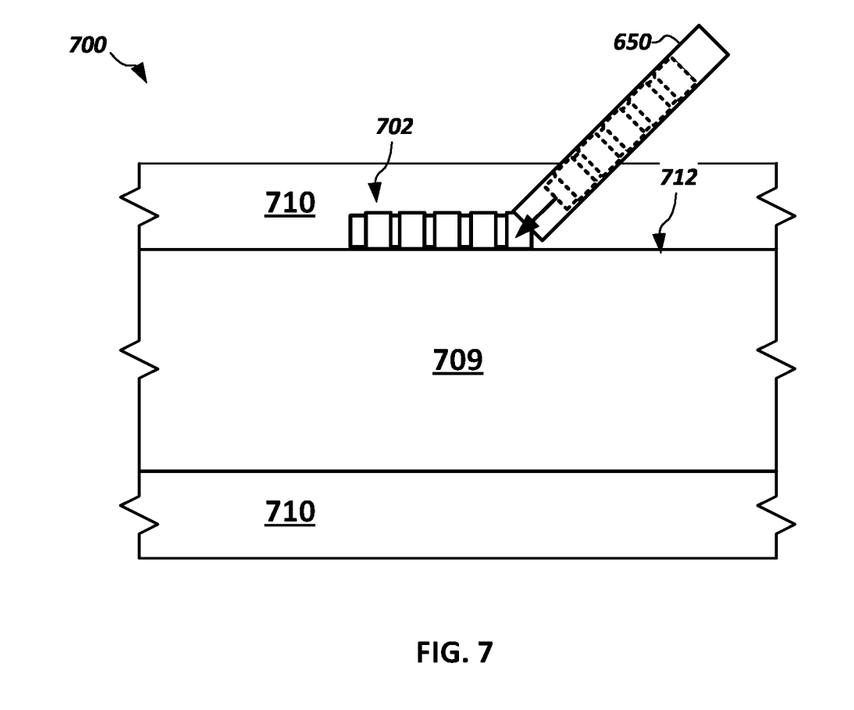
FIG. 7 illustrates a non-destructive process of deploying sensors beneath insulation of a pipe, in accordance with an aspect of the present disclosure.

FIG. 7 shows an example embodiment 700 of a non-destructive method for deployment of sensors consistent with the present disclosure. As shown, a sensor dispenser 650 includes a bore/cavity with a diameter slightly larger than the width of sensor 702. The sensor dispenser 650 is configured to penetrate insulation 710 and pass sensor 702 through the bore on to the sidewall 712 defining the pipe 709. Preferably, the sensor dispenser 650 penetrates the insulation 710 at an angle relative to normal, such as at 45 degrees as shown. Preferably, the sensor dispenser 650 has an outer diameter of 0.25 inches or less to ensure that the penetration of the same into insulation 710 introduces a minimal puncture. The sensor dispenser 650 preferably comprises flexible Polyethylene (PE) conduit, although other materials are within the scope of this disclosure.

After the sensor 702 is disposed on the sidewall 712 of pipe 709, such as shown in FIG. 7, the sensor dispenser 650 may be withdrawn/removed. Preferably, the sensor 702 then directly couples to the sidewall 712. An electrical interconnect, such as electrical interconnect 622 of FIG. 6, may then be electrically coupled to an associated sensor terminal, such as sensor terminal 624 of FIG. 6. This process may then be repeated at predetermined locations along one or more pipes or vessels to deploy sensors consistent with the present disclosure. The sensor dispenser 650 advantageously allows for deployment of sensors beneath the insulation 710 without requiring the insulation 710 to be removed, thus avoiding laborious, time-consuming insulation-removal processes and potential insulation damage.

In accordance with an aspect of the present disclosure a sensor is disclosed. The sensor comprising a first sensor element comprising a first metal, a second sensor element comprising a second metal, the first metal being different from the second metal, one or a plurality of sleeve members to maintain a first predetermined distance between the first and second sensor elements and provide at least one sensing region between the first and second sensor elements, and wherein the first and second sensor elements are configured to electrically couple with each other based on an electrically conductive solution being disposed in the at least one sensing region and causing a galvanic current to be induced between the first and second sensor elements.

In accordance with another aspect of the present disclosure a sensor is disclosed. The sensor comprising a first sensor pair comprising first and second sensor elements, the first and second sensor elements being formed of first and second metals, respectively, the first and second metals being different, a second sensor pair comprising third and fourth sensor elements, the third and fourth sensor elements being formed of third and fourth metals, respectively, the third and fourth metals being different, and a coating disposed on the third or fourth sensor element, the coating configured to prevent electrical communication between the third and fourth sensors until the coating degrades.

In accordance with another aspect of the present disclosure a method of deploying a sensor for detection of corrosion under insulation is disclosed. The method comprising inserting a sensor dispenser through insulation surrounding a pipe or vessel, disposing a sensor on to a sidewall of the pipe or vessel via the sensor dispenser to cause first and second sensor elements of the sensor to be disposed beneath the insulation and at a first predetermined distance from the sidewall of the pipe or vessel, and withdrawing the sensor dispenser from the pipe or vessel.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that an apparatus may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A sensor system for determining corrosion of a pipe/vessel, the pipe/vessel having a coating layer on the outer surface thereof and an insulating layer disposed over the coating layer, the sensor system comprising:
   a sensor device comprising:
      a first sensor element comprising a first metal;
      a second sensor element comprising a second metal, the first metal being different from the second metal;
      one or a plurality of sleeve members to maintain a first predetermined distance between the first and second sensor elements and provide at least one sensing region between the first and second sensor elements; and wherein the first and second sensor elements are configured to electrically couple with each other based on an electrically conductive solution being disposed in the at least one sensing region and causing a galvanic current to be induced between the first and second sensor elements; and a sensor dispenser having a bore with a diameter greater than the sensor device to house the sensor device, the sensor dispenser configured to penetrate the insulation of the pipe/vessel and deliver the sensor device to the pipe/vessel so that the sensor device is disposed between the coating layer on the outer surface of the pipe/vessel and the insulation.

2. The sensor of claim 1, further comprising a sensor terminal electrically coupled to the first and second sensor elements.

3. The sensor of claim 2, wherein the sensor terminal comprises a hall effect sensor to detect the galvanic current based on measuring a local magnetic field formed between the first and second sensor elements.

4. The sensor of claim 2, wherein the sensor terminal is configured to provide an audible and/or visual indication based on the first and second sensors electrically coupling with each other.

5. The sensor of claim 1, wherein the first metal comprises magnesium, and wherein the second metal comprises copper.

6. The sensor of claim 1, wherein the first and second sensor elements have a substantially cylindrical shape.

7. The sensor of claim 1, wherein the one or plurality of sleeve members comprise an electrically insulating material.

8. The sensor of claim 7, wherein the one or plurality of sleeve members comprise high-density polyethylene (HDPE).

9. The sensor of claim 1, wherein the one or plurality of sleeve members include a mating surface for coupling to a sidewall of a pipe/vessel.

10. The sensor of claim 9, wherein the one or plurality of sleeve members are configured to maintain a second predetermined distance between the first and second sensor elements and the sidewall of the pipe/vessel.

11. The sensor of claim 10, wherein the second predetermined distance measures in a range of 1/32 to 1/4 inches.

12. The sensor of claim 1, wherein the first predetermined distance measures in a range of 1/32 to 1/4 inches.

13. The sensor of claim 1, further comprising a coating disposed on the second sensor element, the coating to prevent the second sensor element from electrically coupling to the first sensor element until the coating degrades.

14. The sensor of claim 1, further comprising a third sensor element and a fourth sensor element, the third and fourth sensor elements being disposed adjacent each other and defining one or a plurality of sensing regions there between.

15. The sensor of claim 14, wherein the first and second sensor elements are uncoated and configured to electrically couple to each other based on the electrically conductive solution being disposed in the at least one sensing region, and wherein the third and fourth sensor elements are configured to electrically couple to each other based on a coating disposed on the third sensor element or a coating on the fourth sensor element degrading.

16. A sensor system for determining corrosion of a pipe/vessel, the pipe/vessel having a coating layer on the outer surface thereof and an insulating layer disposed over the coating layer, the sensor system comprising:

a sensor device comprising:

a first sensor pair comprising first and second sensor elements, the first and second sensor elements being formed of first and second metals, respectively, the first and second metals being different;

a second sensor pair comprising third and fourth sensor elements, the third and fourth sensor elements being formed of third and fourth metals, respectively, the third and fourth metals being different; and a coating disposed on the third or fourth sensor element, the coating configured to prevent electrical communication between the third and fourth sensors until the coating degrades, the coating being selected to match the coating layer on the outer surface of the pipe/vessel; and one or a plurality of sleeve members to maintain a first predetermined distance between the first and second sensor elements and a second predetermined distance between the third and fourth sensor elements, wherein the first predetermined distance is greater than the second predetermined distance, and to provide at least one first sensing region between the first and second sensor elements and at least one second sensor region between the third and the fourth sensor elements; and wherein the first and second sensor elements are configured to electrically couple with each other based on an electrically conductive solution being disposed in the at least one first sensing region and causing a galvanic current to be induced between the first and second sensor elements; and wherein the third and fourth sensor elements are configured to electrically couple with each other based on an electrically conductive solution being disposed in the at least one second sensing region and causing a galvanic current to be induced between the third and fourth sensor elements; and a sensor dispenser having a bore with a diameter greater than the sensor device, the sensor dispenser to house the sensor device, the sensor dispenser configured to penetrate the insulation of the pipe vessel and deliver the sensor device to the pipe/vessel so that the sensor device is disposed between the coating layer on the outer surface of the pipe/vessel and the insulation.

17. The sensor of claim 16, wherein the coating comprises polymer-based epoxy, polyurethane, or siloxane-based coatings.

* * * * *